Patented Aug. 16, 1949

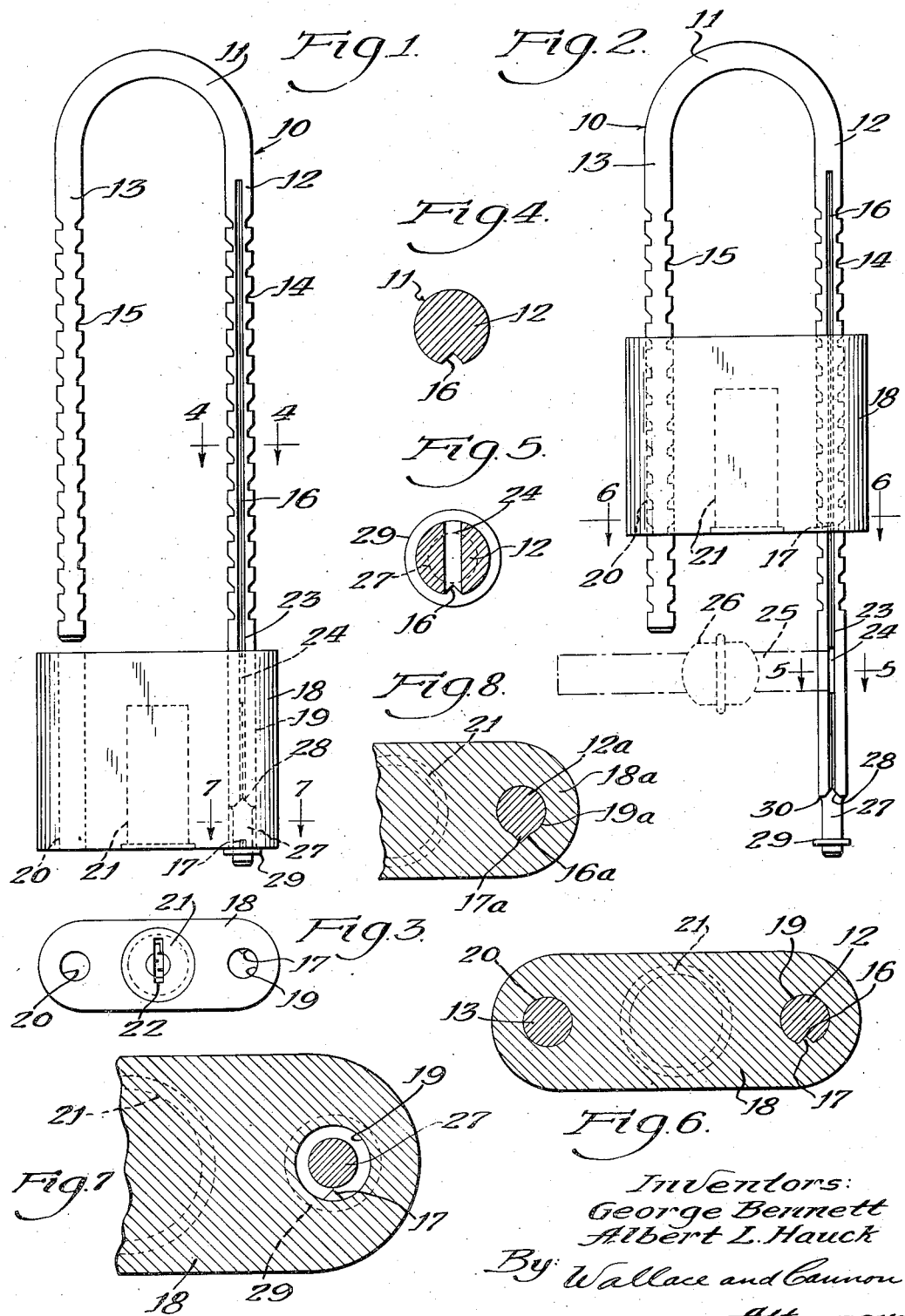

2,479,199

UNITED STATES PATENT OFFICE 2,479,199

COMBINATION AUTOMOTIVE VEHICLE TRUCK LOCK AND SEAL DEVICE

George Bennett, Chicago, Ill., and Albert L. Hauck, Louisville, Ky.

Application August 5, 1948, Serial No. 42,626

7 Claims. (Cl. 70—50)

This invention relates to a combination automotive vehicle truck lock and seal device which is especially adapted and designed for use upon automotive vehicle trucks and truck trailers and in like places and usages in which it may be desired to employ a combination key-controlled lock and seal device.

In the automotive vehicle trucking industry it is a common practice to provide the truck driver with a key-controlled lock for the rear doors of the truck or truck trailer over which he has charge so that he may apply the lock to the rear doors of the truck or truck trailer at the start of his run and remove it at the end thereof; and it is also a common practice in the automotive vehicle trucking industry to seal the rear doors of each truck or truck trailer with a frangible identification-bearing seal, in addition to a key-controlled lock, so that the seal must be broken in order to obtain access to the truck or truck trailer and its contents through the rear doors thereof, thereby affording evidence that the truck or truck trailer have been tampered with and a criminal offense committed.

However, the above-mentioned practices as heretofore employed, have been subject to certain objections and shortcomings. Thus, the key-controlled locks and the frangible seals as heretofore employed together in the trucking industry have commonly been installed separately with the result that one or the other may be neglected or omitted. Moreover, it has been possible heretofore for a dishonest truck driver and persons in collusion with him to open the rear doors of a truck or truck trailer and remove merchandise without being detected; whereas in those instances in which the key-controlled lock may be omitted and only a frangible seal employed on the rear doors of a truck or truck trailer it has been possible for thieves to cut or break the seal readily and remove or tamper with the contents of the truck or truck trailer when the truck or truck trailer is in transit as well as when it is parked en route or at its destination prior to unloading or between shifts of drivers.

Accordingly, an object of the present invention is to provide a new and improved combination automotive vehicle truck lock and seal device which, in use, will overcome the foregoing and other objections to and shortcomings in the prior practices of employing a key-controlled lock and a frangible seal upon an automotive vehicle truck or truck trailer to the end that failure or neglect to apply either the key-controlled lock or the frangible seal will be minimized and substantially eliminated.

Another object of the present invention is to provide a novel combination automotive vehicle truck lock and seal device which, in use, necessitates that the rear doors of a truck or truck trailer on which it is employed be locked before they are sealed, since the construction and arrangement of the parts is such that the frangible seal cannot be installed in position of use upon the new combination lock and seal device until the key-controlled lock body has been moved into locked position and locked therein.

Other objects will appear hereinafter.

In the drawings:

Fig. 1 is an elevational view of a combination automotive vehicle truck lock and seal device embodying the present invention and illustrating the key-controlled lock body in unlocked position and illustrating the position of the key-controlled lock body prior to the application of the frangible seal;

Fig. 2 is an elevational view of the new automotive vehicle combination truck lock and seal device illustrating the key-controlled lock body in locked position and illustrating the frangible seal in applied position;

Fig. 3 is an end or bottom plan view of the key-controlled lock body which is embodied in the form of the new combination automotive vehicle truck lock and seal device which is shown in Figs. 1 to 7, inclusive;

Fig. 4 is a cross sectional view on line 4—4 in Fig. 1, of one arm of the U-shaped shackle which is embodied in the invention;

Fig. 5 is a sectional view on line 5—5 in Fig. 2;

Fig. 6 is an enlarged sectional plan view on line 6—6 in Fig. 2;

Fig. 7 is an enlarged fragmentary sectional plan view on line 7—7 in Fig. 1; and Fig. 8 is an enlarged fragmentary sectional plan view illustrating a modification of the invention.

A typical embodiment of the new combination automotive vehicle truck lock and seal device is illustrated in Figs. 1 to 7, inclusive, of the drawing, wherein it is generally indicated at 10, and comprises a U-shaped shackle member 11 of suitable tough steel or other suitable material. The U-shaped shackle member 11 includes a relatively long arm 12 and a relatively short arm 13. The long arm 12 of the U-shaped shackle member 11 has spaced notches or indentations 14 formed therein and the short arm 13 of the U-shaped shackle member 11 has similar spaced notches or indentations 15 formed therein.

As shown in Figs. 1, 2, 4, 5, 6, and 7, the long arm 12 of the U-shaped shackle member 11 has a longitudinally extending groove 16 formed in its peripheral surface and a correspondingly shaped complementary tongue 17 slidably engages in the groove 16. This tongue 17 is formed as an integral part of the lower end portion of a key-controlled lock body 18 which is provided with spaced openings 19 and 20 which extend therethrough for the reception and passage of the arms 12 and 13, respectively, of the U-shaped shackle member 11. The key-controlled lock body 18 may be of any suitable design and construction and includes a key-controlled lock cylinder 21 which is provided with a centrally arranged key slot 22 (Fig. 3). In addition, the key-controlled lock body 18 is of the type which includes tumblers and related means (not shown), under the control of the key-controlled lock cylinder 21, for locking engagement in the notches 14 and 15 in the arms 12 and 13 of the U-shaped shackle member 11 so as to secure the lock body 18 in locked position upon the arms 12 and 13 of the U-shaped shackle member 11.

The long arm 12 of the U-shaped shackle member 11 has a substantially cylindrical lower portion 23 and this lower portion 23 of the long arm 12 of the U-shaped shackle member 11 has a seal-receiving slot 24 formed in the upper end portion thereof and extending diametrically therethrough (Figs. 2 and 5). This slot 24 is adapted for the reception of the strap portion 25 of a frangible seal 26.

The long arm 12 of the U-shaped shackle member 11 has a substantially cylindrical unnotched lower end portion 27 of reduced diameter, relative to the diameter of the lower portion 23 of the long arm 12, and the lower edge of the substantially cylindrical lower portion 23 of the arm 12 of the substantially U-shaped shackle member 11 has a substantially V-shaped notch 28 formed therein. As shown in Fig. 2, the apex of this V-shaped notch 28 is directed upwardly and the notch 28 opens at its upper end and apex into the lower end portion of the elongated longitudinal groove 16 in the long arm 12 of the U-shaped shackle member 11. The notch 28 opens at its lower end onto the peripheral surface of the reduced and substantially cylindrical lower end portion 27 of the long arm 12 of the U-shaped shackle member 11.

A substantially annular retaining flange 29 is formed upon the lower end portion of the long arm 12 of the U-shaped shackle member 11 and as an integral part thereof.

It will be noted by reference to Figs. 1, 6 and 7 that the tongue 17 which is formed in the lock body 18 extends only a short distance upwardly from the lower edge thereof.

The use and operation of the new automotive vehicle combination truck lock and seal device are as follows:

When the new automotive vehicle combination truck lock and seal thence is disposed in unlocked and unsealed position the parts are arranged substantially as in Fig. 1 and when the parts are in this position the lock body 18 rests upon the substantially annular retaining flange 29 which is formed on the lower end portion of the long arm 12 of the U-shaped shackle member 11. When the lock body 18 is so disposed it may be rotated upon and relative to the substantially cylindrical unnotched portion 23 of the long arm 12 of the U-shaped shackle member 11 by reason of the fact that the reduced diameter of the lower end portion 27 of the long arm 12 of the U-shaped shackle member 11 permits disengagement of the tongue 17 from the groove 16 and consequent turning movement of the lock body 18 upon the lower end portion of the long arm 12 of the shackle member 11 and relative thereto.

It will also be noted, in this connection, that the heighth of the lock body 18 is such that when it is disposed in unlocked and open position upon the retaining flange 29 its upper edge is disposed below the lower end of the short arm 13 of the U-shaped shackle member 11 so that the lock body 18 may be rotated upon and relative to the long arm 12 of the U-shaped shackle member 11.

It will also be noted that the location of the seal-receiving slot 24 in the long arm 12 of the shackle 11 and the height of the lock body 18 are so related to each other that when the lock body 18 is disposed in unlocked position, as in Fig. 1, the lock body 18 closes and conceals the seal-receiving slot 24 and the upper edge of the lock body 18 extends above the upper end of the seal-receiving slot 24. Hence it is impossible to insert the strap portion 25 of the frangible seal 26 through the seal-receiving slot 24 in the long arm 12 of the U-shaped shackle member 11 until the lock body 18 is slidably moved along the long arm 12 of the U-shaped shackle member 11 into a position such that the lower edge of the lock body passes above the upper end of the seal-receiving slot 24 and the short arm 13 of the shackle 11 is engaged in the opening 20 which is provided therefor in the lock body 18. When the lock body is so positioned upon and relative to the U-shaped shackle member 11 a proper key may be inserted into the key slot 22 in the key cylinder 21 and the tumblers and other operating parts of the lock body 18 manipulated into locking engagement with the notches 14 and 15 in the arms 12 and 13, respectively, of the U-shaped shackle member 11 so as to lock the lock body upon and against removal from the arms 12 and 13 of the U-shaped shackle member 11, whereupon the key may be removed from the key slot 22. The strap 25 of the frangible seal 26 may then be inserted through the seal-receiving slot 24 in the long arm 12 of the U-shaped shackle member 11 and the end portions of the seal strap 25 sealed together in a manner which is well understood in the art.

It will thus be seen that in the use of the new combination automotive vehicle truck lock and seal device the officials of a trucking company by which the new combination truck lock and seal device is used will know that the rear doors of a truck or truck trailer upon which the new combination lock and seal device is installed were locked before the frangible seal 25—26 was installed by an authorized employee or official of the trucking company.

Similarly, when the frangible seal 25—26 is removed the officials of the trucking company will know that the frangible seal 25—26 was broken before the new combination truck lock and seal device was unlocked because the new combination truck lock and seal device cannot be unlocked and opened until the seal 25—26 is broken and removed from the slot 24 and the lock body 18 is moved into its lowered and unlocked and open position as in Fig. 1. Thus in the use of the new combination truck lock and seal device the officials of the trucking company by which it may be employed will be enabled to check upon the locking and sealing of their trucks and truck trailers and theft therefrom will be materially reduced.

The substantially V-shaped notch 28 facilitates the entrance of the tongue portion 17 of the lock body 18 into the longitudinally extending groove 16 in the long arm 12 of the U-shaped shackle member 11 as the lock body 18 is moved upwardly along the long arm 13 of the U-shaped shackle member 11 into locked position. As the lock body 18 is thus moved into position to be locked on the arms 12 and 13 of the U-shaped shackle member 11 it exposes the seal-receiving slot 24.

The mating engagement of the tongue 17 in the groove 16 prevents rotational or turning movement of the lock body 18 upon and relative to the long arm 12 of the U-shaped shackle member 11 and assures that the lock body 18 cannot be moved upwardly along one arm of the U-shaped shackle member 11 without, at the same time, being moved upwardly along both arms 12 and 13 of the U-shaped shackle member 11 into position to be locked thereon.

Thus it will be noted, in this connection, that the mating engagement of the tongue 17 in the groove 16 necessitates that the short arm 13 of the U-shaped shackle member 11 enter into the hole or opening 20 in the lock body 18 as the lock body 18 is slid upwardly along the arm 12 of the U-shaped shackle member 11 to expose the seal-receiving slot 24.

A modification of the invention is illustrated in Fig. 8 of the drawing and those parts thereof which are substantially similar to corresponding parts illustrated in Figs. 1 to 7, inclusive, have been given similar reference numerals followed by the additional and distinguishing reference character a.

The modification of the invention which is illustrated in Fig. 8 of the drawing is substantially similar to the form of the invention illustrated in Figs. 1 to 7, inclusive, except that in the modification illustrated in Fig. 8 the tongue 17a is formed in and upon the peripheral surface of the arm 12a of the U-shaped shackle member, rather than in the lock body 18, as in the form of the invention illustrated in Figs. 1 to 7, inclusive, and the corresponding groove 16a is formed in the lower end portion of the lock body 18a, rather than in the long arm 12 of the U-shaped shackle member 11, as in the form of the invention illustrated in Figs. 1 to 7, inclusive.

It will thus be seen from the foregoing description, considered in conjunction with the accompanying drawing, that the present invention provides a new and improved combination automotive vehicle truck lock and seal device having the desirable advantages and characteristics, and accomplishing its intended objects, including those hereinbefore pointed out and others which are inherent in the invention.

We claim:

1. A combination automotive vehicle truck lock and seal device comprising a U-shaped shackle member including a relatively short arm and a relatively long arm, the said relatively long arm including a cylindrical lower end portion having a seal-receiving slot formed therein and extending diametrically therethrough and adapted for the reception of the strap portion of a frangible seal, a key-controlled lock body having a pair of spaced parallel openings extending therethrough for the reception of the said arms so that the said body is slidably mounted upon the said arms, means arranged upon the lower end portion of the said relatively long arm retaining the said lock body thereon in unlocked and open position, the said key-controlled lock body being of a heighth such that when it is disposed in unlocked and open position upon the said retaining means it extends over and closes the said seal-receiving slot, and the height of the said lock body being such that the upper edge thereof is disposed slightly below the lower end of the said relatively short arm whereby the said lock body may be rotated circumferentially around the said cylindrical lower end portion of the said relatively long arm when the said lock body is in unlocked and open position, and interengaging means formed in the said lock body and in the said relatively long arm for preventing rotational or turning movement of the said lock body upon and relative to the said substantially U-shaped shackle member when the said lock body is slid along the said relatively long arm to expose the said seal-receiving slot therein.

2. A combination automotive vehicle truck lock and seal device as defined in claim 1 in which the said interengaging means is in the form of an elongated longitudinally extending groove formed in the peripheral surface of the said relatively long arm and a correspondingly shaped complementary tongue formed in the said lock body and adapted to slidably engage in the said groove when the said lock body is slidably moved upwardly along the said shackle member away from the said retaining means thereon and in a direction to expose the said seal-receiving slot in the said relatively long arm, the said groove extending parallel to and above and below the said seal-receiving slot.

3. A combination automotive vehicle truck lock and seal device as defined in claim 1 in which the said interengaging means is in the form of an elongated longitudinally extending groove formed in the peripheral surface of the said relatively long arm and a correspondingly shaped complementary tongue formed in the said lock body and adapted to slidably engage in the said groove when the said lock body is slidably moved upwardly along the said shackle member away from the said retaining means thereon and in a direction to expose the said seal-receiving slot in the said relatively long arm, and in which the said relatively long arm has a lower end portion of reduced diameter and in which the said groove terminates at its lower end at the upper edge of the said reduced lower end portion of the said relatively long arm, the said groove extending parallel to and above and below the said seal-receiving slot.

4. A combination automotive vehicle truck lock and seal device as defined in claim 1 in which the said interengaging means is in the form of an elongated longitudinally extending groove formed in the peripheral surface of the said relatively long arm and a correspondingly shaped complementary tongue formed in the lower end portion of the said lock body and adapted to slidably engage in the said groove when the said lock body is slidably moved upwardly along the said shackle member away from the said retaining means thereon and in a direction to expose the said seal-receiving slot in the said relatively long arm, and in which the said relatively long arm has a lower end portion of reduced diameter and in which the said groove terminates at its lower end at the upper edge of the said reduced lower end portion of the said relatively long arm, and in which the height of the said tongue is substantially less than the distance between the lower end of the said groove and the said retaining means upon the said relatively long arm, said groove extending parallel to and above and below the said seal-receiving slot.

5. A combination automotive vehicle truck lock and seal device as defined in claim 1 in which the said interengaging means is in the form of an elongated longitudinally extending groove formed in the peripheral surface of the said relatively long arm and a correspondingly shaped complementary tongue formed in the said lock body and adapted to slidably engage in the said groove when the said lock body is slidably moved upwardly along the said shackle member away from the said retaining means thereon and in a direction to expose the said seal-receiving slot in the said relatively long arm, and in which the said relatively long arm has a lower end portion of reduced diameter, and in which the said groove terminates at its lower end at the upper edge of the said reduced lower end portion of the said relatively long arm, and in which the height of the said tongue is less than the distance between the lower end of the said groove and the said retaining means upon the said relatively long arm, and in which the said reduced lower end portion of the said relatively long arm has a V-shaped notch formed therein with the apex of the said V-shaped notch opening upwardly into and merging into the lower end portion of said groove.

6. A combination automotive vehicle truck lock and seal device as defined in claim 1 in which the said relatively long arm has a longitudinally extending tongue formed in its peripheral surface and in which the lower end portion of the said lock body has a correspondingly shaped complementary groove formed therein adapted to slidably receive the said tongue when the said lock body is slidably moved upwardly along the said shackle member away from the said retaining means thereon and in a direction to expose the said seal-receiving slot.

7. A combination automotive vehicle truck lock and seal device comprising a U-shaped shackle member including a relatively short arm and a relatively long arm, a key-controlled lock body having spaced openings formed therein for the reception of the said arms of the said U-shaped shackle member, so that the said lock body is slidably mounted upon the said arms, the said relatively long arm of the said shackle member having a seal-receiving slot formed therein adapted for the reception of a frangible seal adapted to be extended therethrough below the said key-controlled lock body when the said key-controlled lock body is disposed in locked position upon and relative to the said arms of the said shackle member, and the said key-controlled lock body obstructing the said seal-receiving slot in the said relatively long arm and preventing the passage of a frangible seal through the said seal-receiving slot when the said key-controlled lock body is disposed in unlocked position upon and relative to the said arms of the said shackle member.

GEORGE BENNETT.
ALBERT L. HAUCK.

REFERENCES CITED

The following references are of record in the file of this patent:

UNITED STATES PATENTS

| Number | Name | Date |
|---|---|---|
| 319,400 | Gaines | June 2, 1885 |
| 431,051 | Greene | July 1, 1890 |
| 902,456 | Sohni et al. | Oct. 27, 1908 |
| 1,579,632 | Best | Apr. 6, 1926 |
| 1,867,689 | Van Leer | July 19, 1932 |
| 2,093,653 | Young | Sept. 21, 1937 |
| 2,422,841 | McClain | June 24, 1947 |